(12) United States Patent
Taniguchi et al.

(10) Patent No.: US 8,138,249 B2
(45) Date of Patent: Mar. 20, 2012

(54) PHOSPHONATE-CONTAINING TWO-COMPONENT COATING SYSTEM AND THE PRODUCTION AND USE THEREOF

(75) Inventors: Hitoshi Taniguchi, Yokohama (JP); Eishi Tsukamoto, Yokohama (JP); Hiroyuki Takagi, Kanagawa (JP); Andreas Poppe, Shanghai (CN); Sabine Holtschulte, Ascheberg (DE); Julia Melzer, Muenster (DE); Petra Wagner, Sendenhorst (DE); Bjoern Feldmann, Muenster (DE)

(73) Assignees: BASF Coatings Japan Ltd., Yokohama-shi (JP); BASF Coatings GmbH, Munster (DE)

( * ) Notice: Subject to any disclaimer, the term of this patent is extended or adjusted under 35 U.S.C. 154(b) by 0 days.

(21) Appl. No.: 12/532,655

(22) PCT Filed: Mar. 20, 2008

(86) PCT No.: PCT/EP2008/002291
§ 371 (c)(1),
(2), (4) Date: Sep. 23, 2009

(87) PCT Pub. No.: WO2008/116607
PCT Pub. Date: Oct. 2, 2008

(65) Prior Publication Data
US 2010/0120952 A1    May 13, 2010

(30) Foreign Application Priority Data
Mar. 23, 2007   (DE) .................... 10 2007 014 720

(51) Int. Cl.
C08K 5/5333   (2006.01)
C08K 5/5357   (2006.01)

(52) U.S. Cl. ........ 524/132; 524/130; 524/140; 524/141; 524/147

(58) Field of Classification Search .......... 524/140, 524/141, 147, 130, 132
See application file for complete search history.

(56) References Cited

U.S. PATENT DOCUMENTS

| | | | |
|---|---|---|---|
| 3,251,785 A | 5/1966 | Anderson | |
| 3,525,705 A | 8/1970 | Harowitz | |
| 3,746,572 A | 7/1973 | Weil et al. | |
| 4,419,513 A | 12/1983 | Breidenbach et al. | |
| 4,454,317 A | 6/1984 | Disteldorf et al. | |
| 4,547,397 A | 10/1985 | Burzynski et al. | |
| 4,631,142 A | 12/1986 | Sturtz | |
| 4,801,675 A | 1/1989 | Pedain et al. | |
| 5,258,482 A | 11/1993 | Jacobs et al. | |
| 5,290,902 A | 3/1994 | Jacobs et al. | |
| 5,679,804 A | 10/1997 | Ditrich et al. | |
| 5,728,779 A | 3/1998 | van de Werff et al. | |
| 6,111,002 A | 8/2000 | Doring et al. | |
| 6,392,006 B1 | 5/2002 | Van Benthem et al. | |
| 7,078,474 B2 | 7/2006 | Hermann et al. | |
| 2003/0176537 A1 | 9/2003 | Chaiko | |
| 2004/0077801 A1 | 4/2004 | Feola et al. | |
| 2005/0074617 A1 | 4/2005 | Lin et al. | |
| 2006/0009606 A1 | 1/2006 | Hermann et al. | |
| 2006/0156960 A1 | 7/2006 | Wombacher et al. | |
| 2008/0245998 A1* | 10/2008 | Poppe et al. ............ 252/183.11 |
| 2010/0015344 A1 | 1/2010 | Groenewolt et al. | |

FOREIGN PATENT DOCUMENTS

| | | |
|---|---|---|
| CA | 2163591 A1 | 6/1996 |
| DE | 2559259 A1 | 7/1977 |
| DE | 2809588 A1 | 11/1978 |
| DE | 4015155 A1 | 11/1991 |
| DE | 4024204 A1 | 2/1992 |
| DE | 4229183 A1 | 3/1994 |
| DE | 4344063 C1 | 6/1995 |
| DE | 19650478 A1 | 6/1998 |
| DE | 19828935 A1 | 12/1999 |
| DE | 19924170 A1 | 11/2000 |
| DE | 19938758 A1 | 2/2001 |
| DE | 19948004 A1 | 7/2001 |
| DE | 10051485 A1 | 4/2002 |
| DE | 10132654 A1 | 10/2002 |
| DE | 10202819 C1 | 8/2003 |
| DE | 102004060966 A1 | 6/2006 |
| DE | 102005045228 A1 | 4/2007 |
| EP | 0183976 A1 | 6/1986 |
| EP | 0267689 A2 | 5/1988 |
| EP | 0303150 A2 | 2/1989 |
| EP | 0496208 A2 | 7/1992 |
| EP | 0524500 A1 | 1/1993 |

(Continued)

OTHER PUBLICATIONS

International Search Report for PCT/EP2008/002291 dated Jul. 1, 2008.

(Continued)

*Primary Examiner* — Peter Szekely
(74) *Attorney, Agent, or Firm* — Cantor Colburn LLP

(57) ABSTRACT

The invention relates to two-component coating systems comprising as component (a) one or more polyisocyanates, as component (b) one or more oligomeric and/or polymeric compounds that are reactive with component (a), and as component (c) one or more phosphonates selected from the group of phosphonic diesters and diphosphonic diesters, where (i) component (b) comprises all oligomeric and/or polymeric compounds that are present in the two-component coating system and are reactive with component (a) and (ii) component (b) contains not more than 15% by weight, based on the total weight of component (b), of oligomeric and/or polymeric compounds which carry isocyanate-reactive amino groups. Additionally provided by the invention are a process for preparing the two-component coating systems, and the use of these coating systems as a clearcoat, more particularly for multicoat automobile finishing.

18 Claims, No Drawings

FOREIGN PATENT DOCUMENTS

| | | |
|---|---|---|
| EP | 0531820 A1 | 3/1993 |
| EP | 0566037 A2 | 10/1993 |
| EP | 0646608 A1 | 4/1995 |
| EP | 0649806 A1 | 4/1995 |
| EP | 0882748 A2 | 12/1998 |
| EP | 0976723 A2 | 2/2000 |
| EP | 1193278 A1 | 8/2001 |
| EP | 1134266 A1 | 9/2001 |
| EP | 1195397 A1 | 4/2002 |
| EP | 1475360 A1 | 5/2003 |
| JP | 62260868 A | 11/1987 |
| WO | WO9916810 A1 | 4/1999 |
| WO | WO0031194 A1 | 6/2000 |
| WO | WO0037520 A1 | 6/2000 |
| WO | 0055270 A1 | 9/2000 |
| WO | WO0064763 A1 | 11/2000 |
| WO | WO0109231 A1 | 2/2001 |
| WO | WO0109259 A1 | 2/2001 |
| WO | WO0109260 A1 | 2/2001 |
| WO | WO0109261 A1 | 2/2001 |
| WO | WO03011992 A2 | 2/2003 |
| WO | WO2004072189 A2 | 8/2004 |
| WO | WO2005105938 A1 | 11/2005 |
| WO | WO2007/033826 * | 3/2007 |
| WO | WO2007033786 A1 | 3/2007 |

OTHER PUBLICATIONS

Written opinion for PCT/EP2008/02291 filed on Mar. 20, 2008.
International Preliminary Report on Patentability dated Sep. 29, 2009 for International application No. PCT/EP2008/002291.
CAS Registry file search for Dimethyl Methylphosphonate.
CAS Registry file search for Diphosphonic acid.
Hohenesche et al., Journal of Chromotography A, 1025 (2004) 177-187.
International Preliminary Report on Patentability for International Application No. PCT/EP2006/009177 dated Apr. 8, 2008.
International Preliminary Report on Patentability for International Application No. PCT/EP2007/000660 dated Jan. 20, 2009.
International Preliminary Report on Patentability for International Application No. PCT/EP2006/008908 dated Apr. 8, 2008.
International Search Report for International Application No. PCT/EP2006/008908 dated Sep. 13, 2006.
International Search Report for International Application No. PCT/EP2006/009177 dated Nov. 24, 2006.
International Search Report for International Application No. PCT/EP2007/000660 dated Oct. 25, 2007.
CAS Registry file search for Neopentyl Methylphosphonate.
CAS Registry file search for Phosphonic acid.
Written Opinion of the International Searching Authority for International Application No. PCT/EP2007/000660.
Written Opinion of the International Searching Authority for International Application No. PCT/EP2006/008908.
Written Opinion of the International Searching Authority for International Application No. PCT/EP2006/009177.

* cited by examiner

US 8,138,249 B2

PHOSPHONATE-CONTAINING TWO-COMPONENT COATING SYSTEM AND THE PRODUCTION AND USE THEREOF

CROSS REFERENCE TO RELATED APPLICATIONS

This application is a National Phase Application of Patent Application PCT/EP2008/002291 filed on 20 Mar. 2008, which claims priority to DE102007014720.3, filed 23 Mar. 2007, both of which are hereby incorporated by reference.

FIELD OF THE INVENTION

The invention relates to two-component coating systems and also to their preparation and use as a clearcoat, more particularly in the automobile industry.

BACKGROUND OF THE INVENTION

From German patent DE 43 44 063 C1 it is known to use phosphonic acid functionalities in aqueous binder mixtures as groups for increasing the dispersion stability in water. A description is given for this purpose of reacting polyurethane macromonomers containing free phosphonic acid groups with unsaturated monomers in a free-radical addition polymerization and of subsequently further processing the products with further components to give a binder dispersion. In this way, aqueous binder systems are obtained which contain free phosphonic acid groups directly on the backbone of the binder polymer and which hence exhibit anionic stabilization of the aqueous binder dispersion.

Another function of phosphonic acids or their acidic esters in paint chemistry is described in German laid-open specification DE 10 2004 060 966 A1. Such compounds are used therein, alongside other phosphorus acids, organic acid chlorides, and sulfuric or sulfonic acids, as an additive for stabilizing the reaction of isocyanates with hydroxyl-containing polyacrylates. The use of diesters of phosphonic acid or of diphosphonic acid is not described therein.

Another process for producing a coating for the automobile industry that encompasses the use of phosphonic acids or derivatives thereof is disclosed in German laid-open specification DE 196 50 478 A1. Proposed therein as a substitute for the conventional phosphating and/or for the conventional cathodically deposited corrosion control coating is the application of a tie coat of homopolymers or copolymers of double-bond-containing phosphonic acids or functional phosphonic esters to the metal sheet. In that case the polymers of the new corrosion-inhibiting coat presented can be crosslinked inter/intramolecularly, or to the subsequent coat of paint, by means of functional groups which are not adsorbed on the substrate.

A disadvantage of all of the existing two-component coating systems composed of an isocyanate-based curing agent and a basis system is the rapid reaction after the two components have been mixed. This disadvantage is manifested to an increased extent in the case of the industrial coating of vehicles, which requires a certain preliminary time simply on account of the pipeline systems and the industrial operating regime. As a result, with two-component coating systems in particular, the pot life (i.e., duration of proccessability) of the completed coating formulation becomes an important factor. Moreover, the compatibility of the curing components with the binder components of the basis system is of particular significance. With the known systems, the spectrum of compatibility in this context has to date still been restricted, with the consequence that there may often be incompatibilities between the components in question, so that precise matching is necessary. Moreover, the very same two-component systems that are suitable for producing a clearcoat film ought to combine a good profile of properties with regard to environmental influences with hardness, good optical qualities, and effective scratch resistance.

It is therefore an object of the invention to provide a very substantially universal two-component coating material which is distinguished by a good pot life and which at the same time ensures not only a good appearance but also a sufficient hardness. A further object of the invention, furthermore, is to increase the pot life and the compatibility of the generic two-component clearcoat materials through the use of new adjuvants.

SUMMARY OF THE INVENTION

Surprisingly it has emerged that two-component coating systems which comprise
- as component (a) one or more polyisocyanates,
- as component (b) one or more oligomeric and/or polymeric compounds that are reactive with component (a), and
- as component (c) one or more phosphonates selected from the group of phosphonic diesters and diphosphonic diesters, where
  (i) component (b) comprises all oligomeric and/or polymeric compounds that are present in the two-component coating system and are reactive with component (a) and
  (ii) component (b) contains not more than 15% by weight, based on the total weight of component (b), of oligomeric and/or polymeric compounds which carry isocyanate-reactive amino groups, when being processed, exhibit excellent pot lives, very good optical properties on the part of the resulting coating, and a very good microindentation hardness.

DETAILED DESCRIPTION OF A PREFERRED EMBODIMENT OF THE INVENTION

A "two-component coating system" is one in which the chemical reaction that leads to curing is initiated by the mixing of two components (a parent coating material and a curing agent) (DIN 55945: 1996-09). In the present invention, component (a) acts as the curing agent, and component (b) as the parent coating component which is reacted with the curing agent. Since the present component (c) may be present as a catalyst and/or as a co-reactant in the two-component coating system of the invention, it cannot be categorized directly as a curing agent. The concept of the two-component coating system is therefore based exclusively on the presence of components (a) and (b).

As component (a) it is possible to use one or more polyisocyanates, each having at least two, and preferably three, isocyanate functionalities.

Examples of polyisocyanates (a) having two isocyanate functionalities are tetramethylene 1,4-diisocyanate, hexamethylene 1,6-diisocyanate, 2,2,4-trimethylhexamethylene 1,6-diisocyanate, ω,ω'-dipropyl ether diisocyanate, cyclohexyl 1,4-diisocyanate, cyclohexyl 1,3-diisocyanate, cyclohexyl 1,2-diisocyanate, dicyclohexylmethane 4,4"-diisocyanate, 1,5-dimethyl-2,4-di(isocyanato-methyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)benzene, isophorone diisocyanate, dicyclohexyldimethylmethane 4,4"-diisocyanate, m-tetramethylxylylene diisocyanate, 2,4-tolylene diisocyanate, 2,6-tolylene diisocyanate and diphenylmethane 4,4″-diisocyanate.

Further examples of polyisocyanates (a) having two or more isocyanate functionalities are triisocyanates such as nonane triisocyanate (NTI) and also polyisocyanates (a) based on the above-described diisocyanates and triisocyanates (a), more particularly oligomers which contain isocyanurate, biuret, allophanate, iminooxadiazinedione, urethane, carbodiimide, urea and/or uretdione groups and advantageously have an NCO functionality of 2 to 5, preferably of 2.2 to 4.0, more particularly of 2.5 to 3.8. It is also possible to employ part-blocked polyisocyanates having at least two free isocyanate functionalities.

Particular preference is given to using as component (a) alkylene diisocyanates such as hexamethylene 1,6-diisocyanate and the corresponding oligomerized diisocyanates, with very particular preference the trimerized diisocyanates (isocyanurates) formed from them.

Component (b) is composed of one or more oligomeric or polymeric compounds that are reactive with component (a).

By compounds that are "oligomeric" compounds in the sense of component (b) are meant, herein, those composed of 3 to 10 monomer units. Compounds that are "polymeric", in contrast, are those which are composed of at least 11 monomer units. For the purposes of the compositions of the invention, the oligomeric compounds are referred to as crosslinking agents (or crosslinkers) and the polymeric compounds as binders.

Component (b) is reactive toward the isocyanate groups of component (a). Component (b) achieves this through isocyanate-reactive groups such as, for example, hydroxyl groups or thiol groups. Component (b) carries preferably at least two, better still at least three or at least four such groups. Particularly preferred among the isocyanate-reactive groups are the hydroxyl groups.

As component (b) it is preferred to use hydroxy-functional crosslinking agents or binders based on polyester and/or poly(meth)acrylate. The expression "(meth)acrylate" here encompasses not only acrylates but also methacrylates, and the expression "(meth)acrylic acid" encompasses both acrylic acid and methacrylic acid.

Where hydroxy-functional crosslinking agents or binders are used as component (b) they preferably have an OH number which ensures effective crosslinking with the polyisocyanate component and hence sufficient hardness in the resulting coating. With particular preference the polyester and/or poly(meth)acrylate binders or crosslinking agents have an OH number of between 50 and 300, in particular between 100 and 250, and more preferably 150 to 250 mg of KOH/g of component (b). The hydroxyl number (OH number) indicates the number of mg of potassium hydroxide that are equivalent to the amount of acetic acid bound by 1 g of substance on acetylation. In the course of the determination, the sample is boiled with acetic anhydride-pyridine and the acid formed is titrated with potassium hydroxide solution (DIN 53240-2).

The compounds of component (b) preferably possess an acid number of up to about 30, more preferably 2 to 18, g of KOH/g of the compound of component (b). This acid number indicates the number of mg of potassium hydroxide that are consumed in neutralizing 1 g of the respective compound of component (b) (DIN EN ISO 2114).

Of particularly preferred suitability as component (b) are hydroxyl-carrying crosslinking agents or binders having preferably at least two, more preferably at least three, and more particularly at least four hydroxyl groups per molecule. The crosslinking agents or binders may carry primary and/or secondary hydroxyl groups, preference being given to those having primary hydroxyl groups and, only where appropriate, additional secondary hydroxyl groups. Among the crosslinking agents or binders which carry hydroxyl groups, particular preference is given to hydroxyl-carrying polyesters (b1) and hydroxyl-carrying poly(meth)acrylates (b2).

Particularly suitable hydroxyl-carrying polyesters (b1) for preparing the two-component coating systems of the invention are those which possess a number-average molecular weight, $M_n$, of between 500 and 30000 g/mol, preferably between 1000 and 10000 g/mol, and more preferably between 1000 and 5000 g/mol, measured in each case by means of gel permeation chromatography (GPC) against a polystyrene standard.

Preference is given to using those polyesters obtainable by reacting
m1) dicarboxylic and/or polycarboxylic acids or their esterifiable derivatives, together where appropriate with monocarboxylic acids,
m2) polyols, together where appropriate with monools, and
m3) where appropriate, further modifying components.

Particular preference in this context is given to using polyesters which have been prepared without the use of monools and monocarboxylic acids.

Examples that may be mentioned as polycarboxylic acids that can be used as component (m1) are aromatic, aliphatic, and cycloaliphatic polycarboxylic acids. As component (m1) it is preferred to use aromatic and/or aliphatic polycarboxylic acids.

Examples of suitable polycarboxylic acids are phthalic acid, isophthalic acid, terephthalic acid, halophthalic acids, such as tetrachloro- and tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid, and others. The cycloaliphatic polycarboxylic acids can be used in either their cis form or their trans form or as a mixture of both forms. Also suitable are the esterifiable derivatives of the abovementioned polycarboxylic acids, such as, for example, their monoesters or polyesters with aliphatic alcohols having 1 to 4 carbon atoms or hydroxy alcohols having 1 to 4 carbon atoms. An additional possibility, for example, is to use the anhydrides of the abovementioned acids as well.

Examples of monocarboxylic acids which can be used where appropriate together with the polycarboxylic acids are benzoic acid, tert-butylbenzoic acid, lauric acid, isononanoic acid, and hydrogenated fatty acids of naturally occurring oils.

The polyols (m2) include diols and also polyols having three or more hydroxyl groups.

Examples of suitable diols (m2) for preparing the hydroxyl-carrying polyester (b1) are ethylene glycol, propanediols, butanediols, hexanediols, neopentyl glycol hydroxypivalate, neopentyl glycol, diethylene glycol, cyclohexanediol, cyclohexanedimethanol, trimethylpentanediol, and ethylbutylpropanediol. Also suitable, furthermore, are aliphatic polyether diols, such as linear or branched poly(oxyethylene) glycols, poly(oxypropylene) glycols and/or poly(oxybutylene) glycols, and mixed polyether diols such as poly(oxyethylene-oxypropylene) glycols. The polyether diols typically have a number-average molar mass $M_n$ of 400 to 3000 g/mol, which can be determined by means of GPC against a polystyrene standard.

As diols it is also possible, furthermore, to use aromatic or alkylaromatic diols, such as 2-alkyl-2-phenylpropane-1,3-diol or bisphenol derivatives with ether functionality, for example.

Also suitable as further diols are esters of hydroxycarboxylic acids with diols, the diols that can be used being those specified above.

Examples of hydroxycarboxylic acids are hydroxypivalic acid or dimethylolpropanoic acid.

Examples of polyols having at least three hydroxyl groups are ditrimethylolpropane, trimethylolethane, trimethylolpropane, glycerol, pentaerythritol, homopentaerythritol, dipentaerythritol, trishydroxyethyl isocyanate, 1,2,4-butanetriol, propane- and hexane-triols, and trihydroxycarboxylic acids, such as trishydroxy-methyl(ethyl)ethanoic acids. The polyols having at least 3 OH groups can be used alone or as a mixture. Where appropriate the triols can be used together with monohydric alcohols, such as, for example, butanol, octanol, lauryl alcohol, cyclohexanol, tert-butylcyclohexanol, and ethoxylated and/or propoxylated phenols.

Particularly suitable as component (m3) for preparing the hydroxyl-carrying polyesters (b1) are compounds which have a group that is reactive toward the functional groups of the polyester. As a modifying component (m3) it is possible to use diepoxide compounds, and also, where appropriate, monoepoxide compounds. Examples of suitable components (m3) are those described in DE-A-40 24 204 at page 4 lines 4 to 9.

The preparation of hydroxyl-carrying polyesters (b1) takes place in accordance with the known methods of esterification, as described for example in DE-A-40 24 204 at page 4 lines 50 to 65.

This reaction takes place typically at temperatures between 180 and 280° C., in the presence where appropriate of a suitable esterification catalyst, such as, for example, lithium octoate, dibutyltin oxide, dibutyltin dilaurate, para-toluenesulfonic acid, and the like.

The preparation of the hydroxyl-carrying polyesters (b1) is typically conducted in the presence of small amounts of a suitable solvent as azeotrope former. Azeotrope formers used are, for example, aromatic hydrocarbons, such as xylene in particular, and (cyclo)aliphatic hydrocarbons, cyclohexane for example. In addition, however, it is also possible to prepare the polyesters solventlessly (reaction in bulk).

The hydroxyl-carrying (meth)acrylate copolymers used as component (b2) preferably possess number-average molecular weights of between 1000 and 30000 g/mol, preferably between 1000 and 15000 g/mol, in each case measured by GPC against a polystyrene standard.

As (meth)acrylate copolymer (b2) containing hydroxyl groups and, where appropriate, acid groups, suitability is possessed by all (meth)acrylate copolymers that have the indicated OH numbers, acid numbers, and molecular weights.

As component (b2) it is preferred to use (meth)acrylate copolymers which are obtainable by polymerization of ethylenically unsaturated monomers in an organic solvent or a solvent mixture and in the presence of at least one polymerization initiator.

The ethylenically unsaturated monomers and/or mixtures thereof used for the polymerization must comprise hydroxyl-carrying monomers to a degree such that the resultant oligomers or polymers carry on average at least two, better still at least three, and with particular preference at least four hydroxyl groups.

For preparing the hydroxy-functional poly(meth)acrylate resins used in accordance with the invention it is possible to make use, among others, of esters of (meth)acrylic acid or of a mixture of such (meth)acrylic esters. Examples are alkyl (meth)acrylates having up to 20 carbon atoms in the alkyl radical, such as methyl, ethyl, propyl, butyl, hexyl, ethylhexyl, stearyl, and lauryl acrylate and methacrylate, for example, and cycloaliphatic(meth)acrylic esters, such as cyclohexyl(meth)acrylate, isobornyl(meth)acrylate, dicyclopentane(meth)acrylate, and tert-butylcyclohexyl(meth)acrylate, for example. It is also possible, however, to use ethyltriglycol(meth)acrylate and methoxyoligoglycol(meth) acrylate having a number-average molecular weight Mn of preferably 400 to 700 g/mol, or other ethoxylated and/or propoxylated, hydroxyl-free (meth)acrylic acid derivatives.

Examples of ethylenically unsaturated monomers which carry at least one hydroxyl group per molecule include hydroxyalkyl esters, containing primary and/or secondary hydroxyl groups, of acrylic acid, of methacrylic acid or of another $\alpha,\beta$-ethylenically unsaturated carboxylic acid. These esters may derive from an alkylene glycol which is esterified with the acid, or they may be obtained by reaction of the acid with an alkylene oxide. Hydroxyl-carrying ethylenically unsaturated monomers used are preferably hydroxyalkyl esters of acrylic or methacrylic acid in which the hydroxyalkyl group contains up to 20, preferably up to 10, and more preferably up to 6 carbon atoms.

Examples of hydroxyalkyl esters of this kind include 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, hydroxystearyl acrylate, and hydroxystearyl methacrylate. Corresponding esters of other unsaturated acids, such as of ethacrylic acid, crotonic acid, and similar acids having up to about 6 carbon atoms per molecule, may likewise be employed.

As ethylenically unsaturated monomers it is also possible, furthermore, to employ olefinically unsaturated polyols such as trimethylolpropane monoallyl ether, for example.

Ethylenically unsaturated monomers copolymerizable with the other monomers may also be monomers which carry acid groups, preferably monomers carrying one carboxyl group per molecule. Of these, use is made with particular preference of acrylic acid and/or methacrylic acid. Alternatively it is possible to use other ethylenically unsaturated carboxylic acids having preferably up to 6 carbon atoms in the molecule. Examples of such acids include ethacrylic acid, crotonic acid, maleic acid, fumaric acid, and itaconic acid.

Examples of further suitable copolymerizable ethylenically unsaturated monomers for incorporation into the hydroxyl-carrying poly(meth)acrylates are vinylaromatic hydrocarbons, such as styrene, $\alpha$-alkylstyrenes, and vinyltoluene.

The hydroxyl-carrying poly(meth)acrylates (b2) employed in accordance with the invention are prepared preferably in an organic solvent or solvent mixture and in the presence of at least one polymerization initiator. Organic solvents and polymerization initiators used are the solvents and polymerization initiators that are typical for the preparation of polyacrylate resins.

Examples of useful solvents include pentyl acetate, butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate, and 3-methyl-3-methoxybutanol, and also derivatives based on propylene glycol, such as ethyl ethoxypropionate, isopropoxypropanol, methoxypropyl acetate, and the like.

Examples of useful polymerization initiators include initiators that form free radicals, such as tert-butyl peroxy-2-ethylhexanoate (TBPEH), benzoyl peroxide, azobisisobutyronitrile, and tert-butyl perbenzoate, for example. The initiators are used preferably in an amount of 2% to 25% by weight, more preferably of 4% to 15% by weight, based on the total weight of the monomers.

The polymerization is carried out appropriately at a temperature of 80 to 160° C., preferably 110 to 160° C. As solvents it is preferred to use pentyl acetate, n-butanol, ethoxyethyl propionate, and isopropoxypropanol.

The monomers for preparing the hydroxy-functional poly(meth)acrylates (b2) are polymerized preferably at a concentration such that the resultant polyacrylate resin solutions have a solids content of preferably 80% to 60% by weight. Where the polymerization proceeds at relatively high levels of dilution, the above solids content is brought about preferably by evaporative removal of solvents.

Whereas the two-component coating systems known from the prior art frequently comprise amino-containing oligomeric or polymeric compounds, as crosslinking agents or binders, for example, such compounds are to be used only in minor amounts in the compositions of the invention. Therefore, if the compounds used as component (b) include oligomeric or polymeric compounds containing isocyanate-reactive amino groups, these compounds are present, based on the total weight of component (b), at not more 15%, preferably not more than 10%, more preferably not more than 5%, and very preferably not more than 3% by weight. If value is placed in particular on an extended pot life of the two-component coating composition, then the composition, based on the total weight of component (b), contains not more than 3%, more preferably not more than 2% or 1% by weight of, and with very particular preference no amino-containing oligomeric or polymeric compounds which are capable via their amino groups of reacting with isocyanate groups. The term "amino groups" also includes substituted amino groups, which carry, for example, N-hydroxyalkyl or N-alkoxyalkyl groups.

As component (c) the phosphonic diesters and diphosphonic diesters are selected preferably from the group consisting of acyclic phosphonic diesters, cyclic phosphonic diesters, acyclic diphosphonic diesters, and cyclic diphosphonic diesters.

The acyclic phosphonic diesters (c) preferably possess the general formula (I):

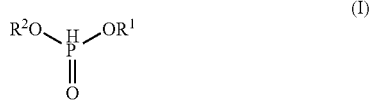

(I)

In the general formula (I) the radicals $R^1$ and $R^2$ are alike or different than one another; preferably they are alike.

The radicals $R^1$ and $R^2$ are selected from the group consisting of:
linear or branched alkyl having 1 to 12, preferably 1 to 8, and more particularly 1 to 4 carbon atoms, cycloalkyl having 3 to 8, preferably 3 to 6, carbon atoms, and aryl having 5 to 10, preferably 6 to 10, carbon atoms and alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl, the alkyl, cycloalkyl, and aryl groups present therein in each case containing the number of carbon atoms recited above.

The radicals $R^1$ and $R^2$ may be substituted or unsubstituted and may in particular contain a heteroatom selected from the group consisting of oxygen, sulfur, nitrogen, phosphorus, and silicon, preferably oxygen, sulfur, and nitrogen.

The preferred cyclic phosphonic diesters (c) are likewise derivable from formula (I). In the case of the cyclic phosphonic diesters, however, the radicals $R^1$ and $R^2$ are to be interpreted as being divalent radicals and are linked via a covalent bond between an atom of the radical $R^1$ and an atom of the radical $R^2$, or via a divalent linking group selected from the group consisting of an oxygen atom, a substituted, more particularly oxygen-substituted, or unsubstituted sulfur atom, a substituted, more particularly alkyl-substituted, nitrogen atom, a substituted, more particularly oxygen-substituted, phosphorus atom, and a substituted, more particularly alkyl-substituted and alkoxy-substituted, silicon atom.

The preferred acyclic diphosphonic diesters (c) possess the general formula (II):

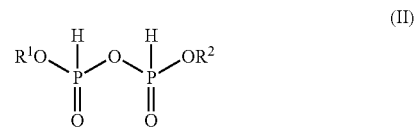

(II)

in which the radicals $R^1$ and $R^2$ possess the same definition as in formula (I).

In the same way as for the cyclic phosphonic diesters, the preferred cyclic diphosphonic diesters (c) derive from the acyclic diphosphonic diesters, the radicals $R^1$ and $R^2$ being joined to one another as described for the phosphonic diesters.

Suitable substituents for the radicals $R^1$ and $R^2$ and the divalent linking group that is present in the case of the cyclic compounds include all groups and atoms which do not affect the action of the phosphonic diesters and the diphosphonic diesters (c), do not inhibit the curing reactions in the mixtures of the invention, and do not lead to unwanted secondary reactions. Examples of suitable substituents are halogen atoms, nitrile groups or nitro groups, preferably halogen atoms, and more particularly fluorine atoms, chlorine atoms, and bromine atoms.

The radicals $R^1$ and $R^2$ are preferably unsubstituted.

The radicals $R^1$ and $R^2$ are preferably selected from the group consisting of phenyl, methyl, and ethyl. Particular preference is given to using methyl or phenyl.

The acyclic phosphonic diesters (c) of the general formula (I) or the acyclic diphosphonic diesters (c) of the general formula (II) are preferably used. Used with particular preference among these are the dialkyl phosphonates and diarylphosphonates.

With particular preference the radicals $R^1$ and $R^2$ of the acyclic phosphonic diesters (c) of the general formula (I) are selected from the group consisting of phenyl, methyl, and ethyl. More particularly, methyl or phenyl is used.

One example of an especially suitable phosphonic diester (c) of the general formula (I) is dimethyl phosphonate, which is sometimes referred to by those in the art (not entirely correctly) as dimethyl phosphite. Of the diaryl phosphonates, diphenyl phosphonate in particular is preferred.

According to one preferred embodiment of the invention component (c) is used in a weight fraction of 1% to 25% by weight, more preferably in a fraction of 1% to 15% by weight, with very particular preference 2% to 10% by weight, based on the weight of component (b).

In accordance with the invention the two-component coating composition, besides the mandatory components (a), (b), and (c), may include further components (d), which are different than components (a), (b), and (c). The sum of components (a), (b), (c), and (d) constitutes the two-component coating system of the invention. Examples of such components are typical coatings additives and adjuvants such as UV stabilizers, fillers, defoamers, emulsifiers, wetting agents, adhesion promoters, photoinitiators, free-radical scavengers, flow control agents, rheological assistants, and light stabilizers. However, the components (d) also include, for example, solvents or pigments. Component (d), though, may also include crosslinkers, binders and/or catalytic adjuvants, provided that they do not fall within one of the definitions of components (a), (b) or (c). Preferably, however, component (d) is not a crosslinking agent or binder. The additives and adjuvants (d) may be varied broadly and are added in effective amounts that are known to the skilled worker. Component (d) also includes, finally, the compounds which by virtue of preparation procedure are present in components (a), (b), and (c), but which do not fall within the definitions of components (a), (b), and (c), such as, for example, catalysts for the preparation of the corresponding components.

Surprisingly it has been found that in accordance with the invention it is possible to obtain an improvement in the compatibility of the components and hence at the same time an improvement in the optical properties of the resulting paint film, independently of any interaction with amino-containing, isocyanate-reactive crosslinking agents or binders. A particular surprise was that the crosslinking or binder component (b) can be free from isocyanate-reactive amino groups and that in spite of that fact the objects of the present invention are achieved. Furthermore, it is not necessary for the two-component coating systems of the invention to include self-condensable crosslinking agents or binders such as, for example, silyl-carrying crosslinking agents or binders. The two-component coating systems of the invention preferably contain less than 15%, more preferably less than 10%, and very preferably less than 5% by weight of self-crosslinking crosslinkers or binders, particularly those that are self-crosslinking via silyl groups. Preferred two-component coating systems of the invention contain no self-crosslinking crosslinkers or binders.

In accordance with the inventors' knowledge to date, the added phosphonate component (c) is able to react with moisture and hence to suppress secondary reactions of the polyisocyanates with, for example, condensation, which give rise to unwanted gelling. On the other hand the phosphonates are able to add to the polyisocyanates across the phosphorus-hydrogen bond, or to undergo complexation with the polyisocyanates, without acting as crosslinking agents. The adducts or complexes thus formed are able in this way, on the one hand, to exert a positive influence on the reactivity of the free polyisocyanates in such a way that an increased pot life is achievable for the two-component coating materials. On the other hand the adducts or complexes of phosphonate and polyisocyanate are able to bring about improved compatibility with respect to component (b). In this way the use of highly polar, highly reactive, strongly crosslinking hydroxy-functional crosslinking agents and/or binders (b), even, is possible, without unwanted clouding in the liquid or cured coating system or a sharp reduction in the pot lives.

Furthermore, an improvement in the microindentation hardness of the paint films resulting in accordance with the invention can be attributed in particular to a possible transesterification reaction of the phosphonates at elevated temperatures, in which hydrolyzed phosphonates react with the hydroxy-functional crosslinking agents or binders that are used as component (b), in a crosslinking reaction.

As solvents for diluting the two-component coating systems of the invention it is preferred to use non-protic solvents which are aromatic and/or contain ester groups.

The present invention relates, furthermore, to a process for preparing the two-component coating system of the invention, by the step of homogeneously mixing components (a), (b), and (c), where preferably in step (A) a premix (V1) is prepared from components (b) and (c) and, where appropriate, component (d) or a part of component (d) and in step (B) this premix V1 is mixed with component (a) or with a premix (V2) composed of component (a) and, where appropriate, component (d) or part of component (d).

In practice, as a result of its preparation process, component (b) is already in solution or dispersion in an organic solvent or solvent mixture, together where appropriate with other adjuvants. In other words, component (b) is frequently already present as a premix with additives or other adjuvants, i.e., compounds of component (d).

Component (a) is frequently present in organic solvents which hence fall within the definition of component (d). Similar comments apply to component (c).

As an alternative to the above procedure, component (a) may also be present as a premix with component (c) and, where appropriate, component (d) or part of component (d), and may subsequently be mixed with a mixture of component (b) and, where appropriate, component (d) or part of component (d).

Generally speaking it is disadvantageous to mix components (a) and (b) in the absence of component (c), since in that case the positive effect on the pot life and compatibility increase between component (a) and (b) does not exist until component (c) is admixed.

Prior to the application, the components as indicated above are first of all intimately mixed, the mixing ratio of components (a) and (b) being given by the amount of groups in component (b) that are reactive toward isocyanate groups and by the amount of isocyanate groups in component (a), taking into account the desired stoichiometry. In accordance with the invention the molar ratio preferably used of isocyanate-reactive groups, more particularly hydroxyl groups, to isocyanate groups is 1:0.8 to 1:1.5, with particular preference 1:0.9 to 1:1.3.

Additionally provided by the invention is the use of the phosphonic diesters and diphosphonic diesters, described above as component (c), in two-component coating systems comprising one or more polyisocyanates and one or more oligomeric or polymeric compounds that carry two or more isocyanate-reactive groups, for the purpose of prolonging the pot life. Prolonging the pot life means that the pot life is prolonged as compared with that of coating systems of identical composition but prepared without using or adding a phosphonic diester or diphosphonic diester.

The invention also provides for the use of the two-component coating systems of the invention as a clearcoat, more particularly in automotive multicoat finishing.

The two-component coating system prepared in accordance with the invention can be applied by known methods such as spraying, dipping, rolling or knifecoating. The substrate to be coated may already have been provided with other paint coats, in particular with the corresponding paint coats of a three-coat or four-coat automobile finish. The two-component coating system of the invention is particularly suitable as a clearcoat, in which case it is applied by the so-called wet-on-wet method to a basecoat film, and subsequently both paint films are jointly cured.

The curing of the two-component coating system of the invention can be accelerated by raising the temperature. Curing takes place preferably in the range from 50° C. to 170° C., more preferably in the range from 80° C. to 150° C.

The resultant film thickness of the clearcoat film produced in this way is preferably between 20 µm and 60 µm, more preferably between 25 µm and 45 µm.

The coating compositions of the invention can be used, for example, to produce clearcoat films in the vehicle industry, to produce refinishes, or as topcoats.

The examples below illustrate the invention without restricting it.

EXAMPLES

Preparation Example 1

Hydroxyl-Functionalized Acrylic Resin A1

A reaction vessel was provided with a condenser and charged with nitrogen. 720.86 parts by weight of pentyl acetate were introduced and were heated with stirring to 135° C.

Two mixtures for addition are prepared. Mixture 1 is composed of 483.13 parts by weight of ethylhexyl methacrylate, 260.7 parts by weight of styrene, and 789.9 parts by weight of 4-hydroxybutyl acrylate.

Mixture 2 is composed of 92.02 parts by weight of pentyl acetate and 153.4 parts by weight of tert-butyl peroxy-2-ethylhexanoate (TBPEH).

After the reaction mixture introduced had been heated to 135° C., mixture 2 was added slowly over a period of 285 minutes. 15 minutes after the beginning of the addition of mixture 2, the addition of mixture 1 was commenced. Mixture 1 was added slowly and at a uniform rate over a period of 240 minutes. Following the complete addition of mixture 2, the reaction mixture was stirred at 135° C. for 120 minutes for post-polymerization.

The solid fraction of the product was 65.8%, the acid number was 2.3 mg KOH/g (based on the solid product), and the viscosity was 18 dPa s (at 23° C.). The hydroxyl number was 200 g KOH/g.

Preparation Example 2

Hydroxyl-Functionalized Acrylic Resin A2

A reaction vessel was provided with a condenser and charged with nitrogen. 720.86 parts by weight of pentyl acetate were introduced and were heated with stirring to 135° C.

Two mixtures for addition are prepared. Mixture 1 is composed of 498.5 parts by weight of ethylhexyl methacrylate, 283.7 parts by weight of styrene, 728.53 parts by weight of 4-hydroxybutyl acrylate, and 23.01 parts by weight of acrylic acid.

Mixture 2 is composed of 92.02 parts by weight of pentyl acetate and 153.4 parts by weight of TBPEH.

After the reaction mixture introduced had been heated to 135° C., mixture 2 was added slowly over a period of 285 minutes. 15 minutes after the beginning of the addition of mixture 2, the addition of mixture 1 was commenced. Mixture 1 was added slowly and at a uniform rate over a period of 240 minutes. Following the complete addition of mixture 2, the reaction mixture was stirred at 135° C. for 120 minutes for post-polymerization.

The solid fraction of the product was 65.7%, the acid number was 11.6 mg KOH/g (based on the solid product), and the viscosity was 15 dPa s (at 23° C.). The hydroxyl number was 185 g KOH/g.

Preparation Example 3

Hydroxyl-Functionalized Acrylic Resin A3

A reaction vessel was provided with a condenser and charged with nitrogen. 720.86 parts by weight of pentyl acetate were introduced and were heated with stirring to 135° C.

Two mixtures for addition are prepared. Mixture 1 is composed of 368.10 parts by weight of ethylhexyl methacrylate, 460.12 parts by weight of styrene, 452.45 parts by weight of 2-hydroxyethyl methacrylate, 230.06 parts by weight of 4-hydroxybutyl acrylate, and 23.01 parts by weight of acrylic acid.

Mixture 2 is composed of 92.02 parts by weight of pentyl acetate and 153.4 parts by weight of TBPEH.

After the reaction mixture introduced had been heated to 135° C., mixture 2 was added slowly over a period of 285 minutes. 15 minutes after the beginning of the addition of mixture 2, the addition of mixture 1 was commenced. Mixture 1 was added slowly and at a uniform rate over a period of 240 minutes. Following the complete addition of mixture 2, the reaction mixture was stirred at 135° C. for 120 minutes for post-polymerization.

The solid fraction of the product was 68.2%, the acid number was 14.02 mg KOH/g (based on the solid product), and the viscosity was 6.8 dPa s (at 23° C.). The hydroxyl number was 186 g KOH/g.

Examples 1-4

Inventive Clearcoat with Different Amounts of Dimethyl Phosphonate—Microindentation Hardness The parts by weight of the raw materials for the paints in Table 1 were combined in succession and homogenized in order to prepare the base composition.

TABLE 1

| Raw material | Trial No. 1 | Trial No. 2 | Trial No. 3 | Trial No. 4 |
|---|---|---|---|---|
| Acrylic resin A 1 from preparation example 1 | 81.23 | 81.23 | 81.23 | 81.23 |
| Butanol | 1.54 | 1.54 | 1.54 | 1.54 |
| n-Butyl glycolate | 4.76 | 4.76 | 4.76 | 4.76 |
| 1-Methoxy-2-propyl acetate | 8.01 | 8.01 | 8.01 | 8.01 |
| Pentyl acetate | 9.61 | 9.61 | 9.61 | 9.61 |
| Butyldiglycol acetate | 4.95 | 4.95 | 4.95 | 4.95 |
| Ethoxypropyl acetate | 2.43 | 2.43 | 2.43 | 2.43 |
| Xylene | 1.35 | 1.35 | 1.35 | 1.35 |
| Dimethyl phosphonate | 0 | 1.19 | 2.39 | 4.77 |
| Byk 331 | 0.09 | 0.09 | 0.09 | 0.09 |
| Byk ES-80 | 0.19 | 0.19 | 0.19 | 0.19 |
| Tinuvin 292 | 0.93 | 0.93 | 0.93 | 0.93 |
| Tinuvin 384 | 1.12 | 1.12 | 1.12 | 1.12 |

Byk 331 is a silicone-based surface additive from Byk Chemie, Byk ES-80 is an additive for increasing the conductivity of electrostatically sprayable coating materials, from Byk Chemie, and Tinuvin 292 and Tinuvin 384 are light stabilizers, developed especially for coating materials, from Ciba Spezialitätenchemie.

The curing agent used was the hexamethylene diisocyanate-based polyisocyanate Basonat HI 190 (purchasable from BASF AG). The parts by weight of the curing agent, given below, were added to 100 parts by weight in each case of the base compositions set out in Table 1:
Trial No. 1: 38.5
Trial No. 2: 38.1
Trial No. 3: 37.7
Trial No. 4: 37.2

The two-component clearcoats from experimental examples 1 to 4 were applied to test panels. Each of these panels was coated with a standard, known, cathodically deposited, thermally cured electrocoat, a conventional, known, thermally cured primer coat, and a coat of a commercially available, solvent-based, silver or black basecoat from BASF Coatings AG, and subjected to initial drying at 80° C. for 10 minutes. The coat of the basecoat and the coat of the clearcoat were dried together at 140° for 22 minutes. The resulting basecoat had a film thickness of 7.5 μm, and the clearcoat a film thickness of 40 μm.

Examination of the resulting test panels for microindentation hardness demonstrates the positive effect of the dimethyl phosphonate on the microindentation hardness of the resultant film. In addition it was possible to observe a considerable improvement in the appearance.

TABLE 2

|  | Microindentation hardness [N/mm2] | Appearance (inspection) |
|---|---|---|
| Trial No. 1 | 60 | uneven surface, orange peel |
| Trial No. 2 | 72 | good, very much less orange peel than in trial 1 |
| Trial No. 3 | 73 | good, very much less orange peel than in trial 1 |
| Trial No. 4 | 79 | good, very much less orange peel than in trial 1 |

A clear improvement was observed in the microindentation hardness (determined in accordance with ASTM E 384 (1999)).

Examples 5-7

Inventive Clearcoat with Different Amounts of Dimethyl Phosphonate—Pot Life Extension The parts by weight of the raw materials for the coating materials according to Table 3 were combined in succession and homogenized in order to prepare the base composition.

TABLE 3

| Raw material | Trial No. 5 | Trial No. 6 | Trial No. 7 |
|---|---|---|---|
| Acrylic resin A 2 from preparation example 2 | 53.39 | 53.39 | 53.39 |
| Acrylic resin A 3 from preparation example 3 | 16.99 | 16.99 | 16.99 |
| Butanol | 1.30 | 1.30 | 1.30 |
| n-Butyl glycolate | 4.03 | 4.03 | 4.03 |
| 1-Methoxy-2-propyl acetate | 6.78 | 6.78 | 6.78 |

TABLE 3-continued

| Raw material | Trial No. 5 | Trial No. 6 | Trial No. 7 |
|---|---|---|---|
| Pentyl acetate | 8.14 | 8.14 | 8.14 |
| Butyldiglycol acetate | 4.19 | 4.19 | 4.19 |
| Ethoxypropyl acetate | 2.05 | 2.05 | 2.05 |
| Xylene | 1.15 | 1.15 | 1.15 |
| Dimethyl phosphonate | 0 | 6 | 12 |
| Byk 331 | 0.08 | 0.08 | 0.08 |
| Byk ES-80 | 0.16 | 0.16 | 0.16 |
| Tinuvin 292 | 0.79 | 0.79 | 0.79 |
| Tinuvin 384 | 0.95 | 0.95 | 0.95 |

Byk 331 is a silicone-based surface additive from Byk Chemie, Byk ES-80 is an additive for increasing the conductivity of electrostatically sprayable coating materials, from Byk Chemie, and Tinuvin 292 and Tinuvin 384 are light stabilizers, developed especially for coating materials, from Ciba Spezialitätenchemie.

The curing agent used was the hexamethylene diisocyanate-based polyisocyanate Basonat HI 190 (purchasable from BASF AG). The parts by weight of the curing agent, given below, were added to 100 parts by weight in each case of the base compositions set out in Table 3:
Trial No. 5: 36
Trial No. 6: 34
Trial No. 7: 32

Visual examination of the resulting test areas for appearance showed the positive effect resulting from dimethyl phosphonate on the surface smoothness of the resultant film (Table 4). The pot life was likewise determined (Table 4). Here an even much more pronounced positive effect was brought about by the dimethyl phosphonate.

TABLE 4

|  | Appearance, inspection | Pot life of the inventive two-component coating system [minutes] |
|---|---|---|
| Trial No. 5 | uneven surface, orange peel | 270 |
| Trial No. 6 | better than trial 5, still some orange peel | 420 |
| Trial No. 7 | outstanding flow smooth surface | more than 480 |

The pot life was determined in a closed vessel. A mixture of the base compositions and the curing agent was observed, while the vessel was agitated at regular intervals of 30 minutes until the mixture was no longer fluid.

What is claimed is:

1. A two-component coating system comprising
    a component (a) comprising one or more polyisocyanates,
    a component (b) comprising one or more oligomeric and/or polymeric compounds that are reactive with component (a), which component (b) has an acid number of up to 30 mg KOH/g, wherein component (b) comprises at least one member selected from the group consisting of a polyester having at least two hydroxyl groups or a poly (meth)acrylate having at least two hydroxyl groups; and
    a component (c) comprising one or more phosphonates selected from the group consisting of phosphonic diesters and diphosphonic diesters,
    where
    (i) component (b) contains all oligomeric and/or polymeric compounds that are present in the two-component coating system and are reactive with component (a) and
    (ii) component (b) contains not more than 15% by weight, based on the total weight of component (b), of oligomeric and/or polymeric compounds which carry isocyanate-reactive amino groups;
wherein component (c) is capable of reacting with moisture to suppress secondary reactions of polyisocyanates with condensation that give rise to unwanted gelling.

2. The two-component coating system of claim 1, wherein component (c) is selected from the group consisting of dialkyl phosphonates and diaryl phosphonates.

3. The two-component coating system of claim 1, wherein component (c) is selected from the group consisting of dimethyl phosphonate, diethyl phosphonate, and diphenyl phosphonate.

4. The two-component coating system of claim 1, comprising component (c) in a weight fraction of 1% to 25% by weight, based on the weight of component (b).

5. The two-component coating system of claim 1, wherein component (b) comprises a poly(meth)acrylate having at least two hydroxyl groups.

6. The two-component coating system of claim 5, wherein component (b) comprises a hydroxyl number of between 100 and 250 mg of KOH per gram of component (b).

7. The two-component coating system of claim 1, wherein component (b) contains not more than 5% by weight, based on the total weight of component (b), of oligomeric or polymeric compounds which carry isocyanate-reactive amino groups.

8. The two-component coating system of claim 1, wherein component (a) is a diisocyanate or an oligomer of a diisocyanate.

9. The two-component coating system of claim 8, wherein the oligomer of the diisocyanate is an isocyanurate or uretdione.

10. A process for preparing the two-component coating system of claim 1, comprising homogeneously mixing components (a), (b), and (c) and in a
step (A) preparing a premix (V1) of components (b) and (c), and in a
step (B) mixing the premix V1 with component (a) or with a premix (V2) of component (a).

11. The process for preparing the two-component coating system of claim 10, where components (a), (b) and/or (c) are used in the form of a premix with a component (d) or a part of a component (d).

12. The process for preparing the two-component coating system of claim 11, where component (d) comprises a solvent and wherein solvents for diluting the two-component coating system are non-protic solvents that are aromatic or contain ester groups or are both aromatic and contain ester groups.

13. A method of making a multicoat automobile finish, comprising applying to a substrate, the two-component coating system of claim 1 as a clearcoat wet-on-wet to a basecoat film.

14. A method of prolonging pot life of a two-component coating system, comprising using the two-component coating system of claim 1 comprising one or more polyisocyanates (a) and one or more oligomeric or polymeric compounds (b) which carry two or more isocyanate-reactive groups, with the component (c) for the purpose of prolonging the pot life.

15. A two-component coating system comprising
a component (a) comprising a polyisocyanate selected from the group consisting of alkylene diisocyanate, oligomerized alkylene diisocyanate, and combinations thereof;
a component (b) comprising one or more oligomeric and/or polymeric compounds that are reactive with component (a), which component (b) has an acid number of up to 30 mg KOH/g, wherein component (b) comprises at least one member selected from the group consisting of a polyester having at least two hydroxyl groups or a poly(meth)acrylate having at least two hydroxyl groups; and
a component (c) comprising one or more phosphonates selected from the group consisting of phosphonic diesters and diphosphonic diesters, where
(i) component (b) contains all oligomeric and/or polymeric compounds that are present in the two-component coating system and are reactive with component (a) and
(ii) component (b) contains not more than 15% by weight, based on the total weight of component (b), of oligomeric and/or polymeric compounds which carry isocyanate-reactive amino groups;
wherein component (c) is capable of reacting with moisture to suppress secondary reactions of polyisocyanates with condensation that give rise to unwanted gelling.

16. The two-component coating system of claim 15, wherein component (a) comprises a trimerized diisocyanate formed from an alkylene diisocyanate.

17. The two-component coating system of claim 16, wherein component (a) comprises trimerized hexamethylene 1,6-diisocyanate.

18. The method of claim 17, comprising curing the clearcoat and basecoat at 50 to 170° C.

* * * * *